Feb. 23, 1926.

W. W. RAGSDALE

ATTACHMENT FOR HARVESTERS

Filed May 28, 1924  2 Sheets-Sheet 1

1,574,691

William W. Ragsdale
INVENTOR

BY Victor J. Evans
ATTORNEY

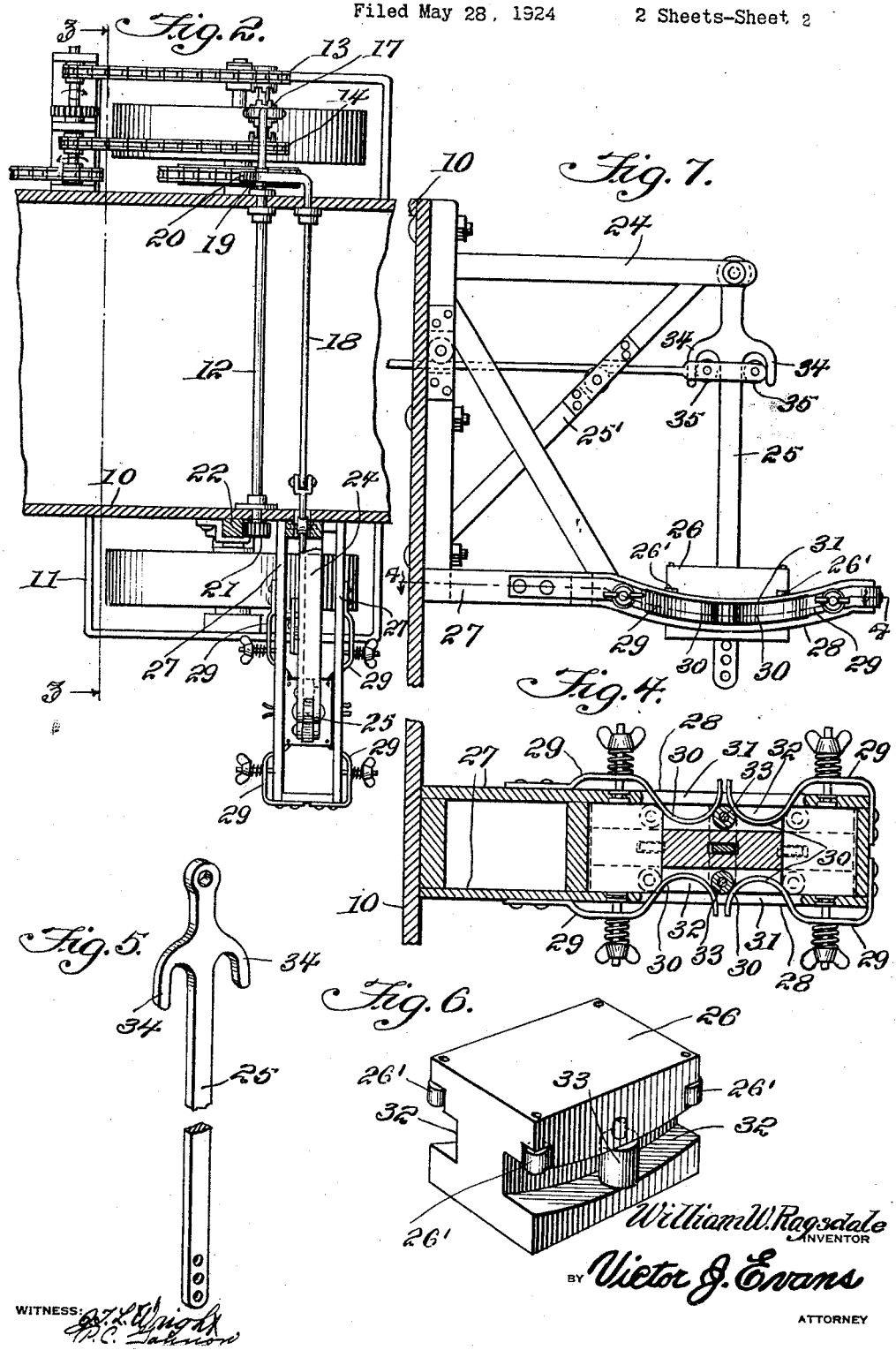

Patented Feb. 23, 1926.

1,574,691

UNITED STATES PATENT OFFICE.

WILLIAM W. RAGSDALE, OF MESA, WASHINGTON.

ATTACHMENT FOR HARVESTERS.

Application filed May 28, 1924. Serial No. 716,529.

*To all whom it may concern:*

Be it known that I, WILLIAM W. RAGS-DALE, a citizen of the United States, residing at Mesa, in the county of Franklin and State of Washington, have invented new and useful Improvements in Attachments for Harvesters, of which the following is a specification.

This invention relates to combined harvesters and has particular relation to means for keeping the harvester body in a level position, so that whether traveling over rough or hilly ground, the body of the machine will be automatically leveled and the operation of the mechanism facilitated.

Another object of the invention is the provision of novel means for accomplishing the above, which is simple and efficient in operation and which may be easily and quickly secured to the leveling mechanism of a harvesting machine.

With the above and other objects in view, the invention further includes the following novel features and details of construction, to be hereinafter more fully described, illustrated in the accompanying drawings and pointed out in the appended claims.

In the drawings:—

Figure 2 is a fragmentary plan view of the same.

Figure 4 is an enlarged horizontal section through one end of the weight supporting arms, as along line 4—4 of Fig. 7 showing the means for yieldingly holding the weight in normal position.

Figure 5 is a detail perspective view of the pivoted lever.

Figure 6 is a similar view of the weight.

Figure 7 is an enlarged elevation of the lever and weight assembly.

Figure 1:
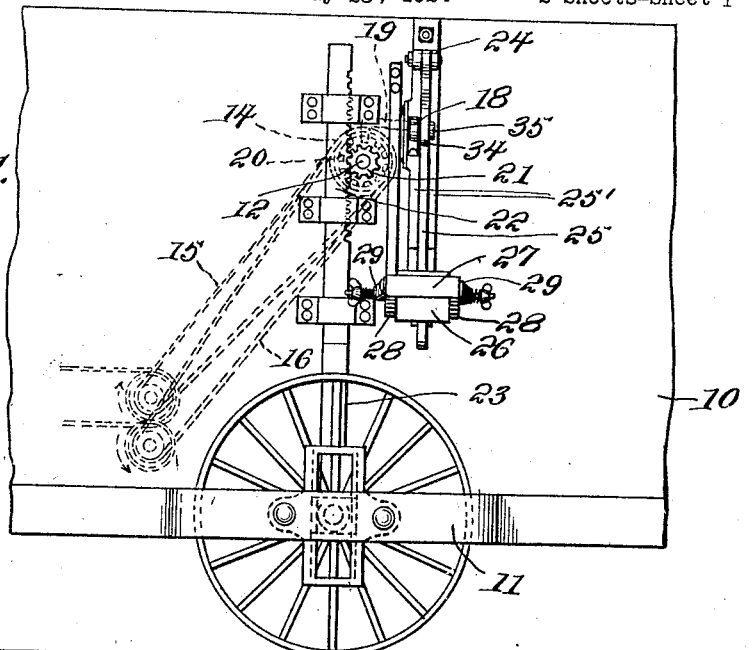
Figure 1 is a side elevation showing a portion of a combined harvesting machine with the invention applied.
Figure 3:
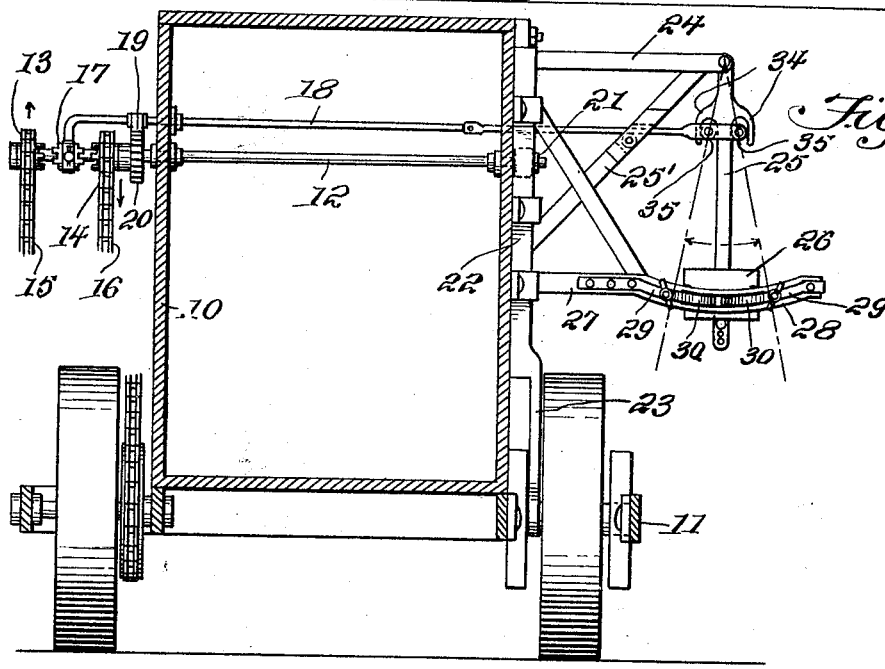
Figure 3 is a vertical transverse section along line 3—3 of Fig. 2.

Referring to the drawings in detail wherein like characters of reference denote corresponding parts, the reference character 10 indicates a portion of the frame or casing of a combined harvester, thresher and separator, a portion of the wheel frame of which is shown at 11.

In machines of this type, the casing or frame 10 which carries the mechanism is usually movable independently of the wheel frame, that is, it is capable of lateral swinging movement and is provided with suitable mechanism for maintaining the frame or casing in level position so as not to interfere with the mechanism of the combined harvester. This leveling mechanism may be of any suitable type and forms no part of the present invention, the mechanism shown comprising a transversely disposed shaft 12 which is mounted in suitable bearings and which carries for free rotation thereon sprockets 13 and 14. These sprockets are driven by chains 15 and 16 respectively which are operated by the mechanism of the machine proper. The sprockets 13 and 14 are each provided with a clutch face which is adapted to be engaged by a clutch member 17 which is secured to and slidable upon the shaft 12, the said clutch member being connected to one end of a clutch rod 18 which extends from one side of the harvester as shown. This clutch rod 18 carries a dog or latch 19 which is adapted for engagement with the teeth of a wheel or gear 20 secured to the shaft 12.

The shaft 12 also has secured thereto a pinion 21 which engages the teeth of a rack 22, the latter being secured to a bar or standard 23 whose lower end is secured to the wheel frame 11. This standard is movable in suitable guides carried by the frame 10.

The mechanism just described is of the usual construction, the rod 18 being ordinarily manually operated to cause the clutch member 17 to engage the clutch face of either of the sprockets 13 so as to rotate the shaft in a direction controlled by the direction of movement of the sprockets 13, the latter being driven in opposite directions. This shifting of the clutch rod 18 will disengage the dog or latch 19 from the wheel 20 and permit the shaft to rotate so as to move the bar or standard 22 vertically and adjust the lateral position of the frame 10.

The present invention provides means for automatically shifting the rod 18 to control the shaft 12 and for this purpose provides a bracket arm 24 which extends laterally from one side of the frame 10 and includes a brace 25'. Pivotally mounted in the bracket arm 24 is one end of a lever 25, the lower end of this lever passing through an opening provided in a weight 26. The weight 26 is supported between spaced parallel arms 27 which extend laterally from the frame 10 below the bracket arm 24 and which includes curved or arcuate-shaped portions 28. The arms 27 have secured thereto spring arms 29 whose free ends are curved as shown at 30 and extend through slots 31 provided in the arcuate portions 28 of the arms 27. The curved ends 30 of the arms 29 engage grooves 32 provided in opposite sides of the weight 26 and are normally positioned upon opposite sides of rollers 33 one of which is mounted in each of the grooves 32.

The rod 18 is operatively connected to the lever 25 and for this purpose the said lever carries oppositely located curved extensions 34 while the rod 18 is bifurcated at its outer end to receive the lever 25, while pins 35 connect the bifurcated ends of the rod and are located upon opposite sides of the lever.

Normally, that is, when the machine is traveling on level ground, the frame or casing 10 will be in an upright position and the weight 26 will be located directly beneath the point of pivotal connection of the lever 25 with the bracket arm 24. As the rollers 33 of the weight will then be positioned between the curved ends of the spring arms 25, the weight will be yieldingly held against movement or prevented from swinging. When the frame 10 of the machine is tilted laterally in either direction, the weight will overcome the spring tension of the arms 29 and will move in accordance with the direction of tilt of the frame. This movement will move the clutch rod 18 longitudinally to engage one of the sprockets 13 or 14 so that the particular sprocket engaged will be locked to the shaft 12. At the same time, movement of the rod 18 will release the wheel 20 and permit the shaft 12 to rotate so as to impart movement to the bar or standard 23 as previously described. The degree of this movement will be governed by the tilt of the frame 10. As soon as the machine again reaches level ground, the weight will resume its normal position and the dog or latch 19 will again engage the wheel 20 so as to hold the shaft 12 against rotation. The weight 26 is provided at its corners with anti-friction rollers 26'.

The invention is susceptible of various changes in its form, proportions and minor details of construction and the right is herein reserved to make such changes as properly fall within the scope of the appended claims.

Having described the invention what is claimed is:—

1. The combination with a leveler mechanism for harvesters including a horizontally movable clutch rod, of a pivotally mounted lever, means operatively connecting the lever and clutch rod, a weight for said lever, whereby lateral inclined movement of the harvester will move the lever and actuate the clutch rod and combined means for holding the lever in normal position and guiding the weight.

2. The combination with a leveler mechanism for harvesters including a horizontally movable clutch rod, of a horizontally disposed bracket arm extending laterally from the harvester, a lever pivotally secured thereto, means operatively connecting the lever and clutch rod, horizontally disposed spaced arms also extending laterally from the harvester below the bracket arm, a weight secured to the lever and movable between the spaced arms and means for yieldingly holding the weight in normal position.

3. The combination with a leveler mechanism for harvesters including a horizontally movable clutch rod, of a horizontally disposed bracket arm extending laterally from the harvester, a lever pivotally secured thereto, means operatively connecting the lever and clutch rod, horizontally disposed spaced arms also extending laterally from the harvester below the bracket arm, a weight secured to the lever and movable between the spaced arms and oppositely located inwardly extending spring arms secured to the spaced arms and engaging the weight to yieldingly hold the latter in normal position.

WILLIAM W. RAGSDALE.